United States Patent
McMillen et al.

(10) Patent No.: US 6,473,827 B2
(45) Date of Patent: *Oct. 29, 2002

(54) DISTRIBUTED MULTI-FABRIC INTERCONNECT

(75) Inventors: Robert James McMillen, Carlsbad; Chinh Kim Nguyen, San Diego, both of CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/218,954

(22) Filed: Dec. 22, 1998

(65) Prior Publication Data

US 2002/0138683 A1 Sep. 26, 2002

(51) Int. Cl.[7] ................................................ G06F 13/00
(52) U.S. Cl. ....................................................... 710/316
(58) Field of Search ................................. 710/131, 132, 710/316, 317

(56) References Cited

U.S. PATENT DOCUMENTS

| | | | |
|---|---|---|---|
| 4,543,630 A | | 9/1985 | Neches |
| 4,925,311 A | | 5/1990 | Neches et al. |
| 4,939,509 A | | 7/1990 | Bartholomew et al. |
| 5,065,394 A | * | 11/1991 | Zhang ......................... 370/411 |
| 5,303,383 A | | 4/1994 | Neches et al. |
| 5,313,649 A | * | 5/1994 | Hsu et al. |
| 5,321,813 A | * | 6/1994 | McMillen et al. |
| 5,559,970 A | * | 9/1996 | Sharma |
| 5,875,314 A | * | 2/1999 | Edholm |
| 6,105,122 A | * | 8/2000 | Muller et al. ............... 710/131 |
| 6,138,185 A | * | 10/2000 | Nelson et al. .............. 710/132 |
| 6,223,242 B1 | * | 4/2001 | Sheafor et al. ............. 710/132 |
| 6,304,568 B1 | * | 10/2001 | Kim ........................... 370/387 |
| 6,343,067 B1 | * | 1/2002 | Drottar et al. .............. 370/218 |
| 2002/0007464 A1 | * | 1/2002 | Fung .......................... 713/320 |

OTHER PUBLICATIONS

Cariño Jr., Felipe et al., "Industrial Database Supercomputer Exegesis: The DBC/1012, The NCR 3700, The Ynet, and The Bynet," Teradata Advanced Concepts Laboratory, El Segundo, California, 1994, pp. 139–157.

Neches, Philip M., "The Ynet: An Interconnect Structure for a Highly Concurrent Data Base Computer System," Teradata Corporation, 1988, pp. 1–7.

* cited by examiner

Primary Examiner—Paul R. Myers
(74) Attorney, Agent, or Firm—Gates & Cooper

(57) ABSTRACT

An interconnect network having a plurality of identical fabrics partitions the switching elements of the fabrics, so that many links can be combined into single cables. In the partitioning method, one or more of the switching elements from the first stage of each of the fabrics are physically packaged onto the same board called a concentrator, and these concentrators are physically distributed among the processing nodes connected to the interconnect network. The concentrator allows all the links from each processing node to a concentrator, each of which need to be connected to different fabrics, to be combined into a single cable. Furthermore, the concentrator allows all the links from a single switching element in the first stage to be combined into a single cable to be connected to the subsequent or expansion (second and higher) stages of the fabric. The subsequent or expansion stages of each fabric can be implemented independently of other fabrics in a centralized location.

52 Claims, 12 Drawing Sheets

GENERIC BIDIRECTIONAL
a x b CROSSBAR

TYPE I: a x b BIDIRECTIONAL CROSSBAR
WITH BIDIRECTIONAL PHYSICAL LINKS
AND DIRECTION CONTROL PER LINK

TYPE IIa: a x b BIDIRECTIONAL CROSSBAR MADE
WITH DUAL UNIDIRECTIONAL SWITCHING ELEMENTS

TYPE IIb: a x b BIDIRECTIONAL CROSSBAR MADE
WITH A ( a+b ) x ( a+b ) UNIDIRECTIONAL SWITCHING ELEMENT

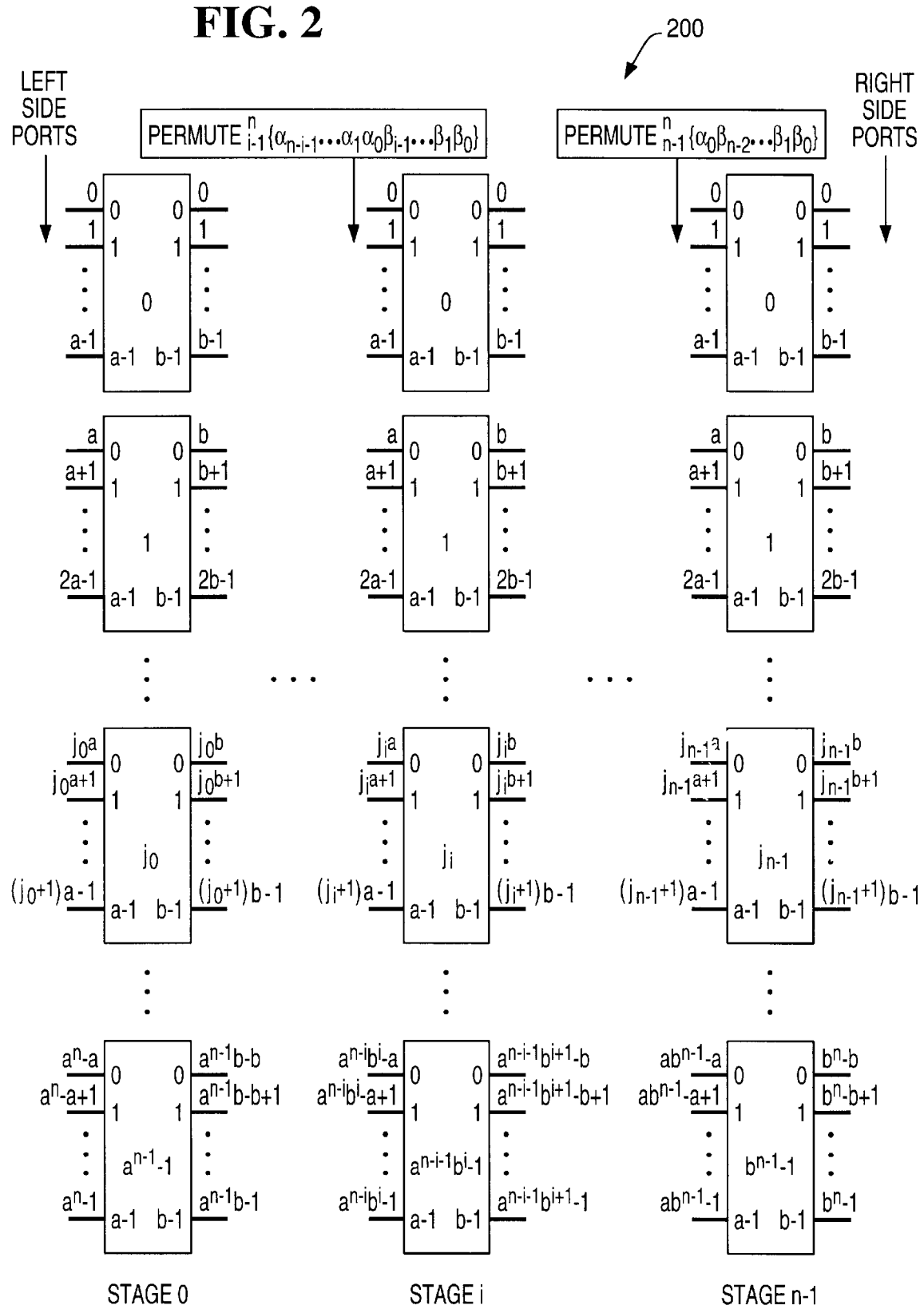

← 600

64 x 64
INTERCONNECT
NETWORK

DISTRIBUTED MULTI-FABRIC INTERCONNECT

CROSS-REFERENCE TO RELATED APPLICATIONS

This application is related to co-pending and commonly-assigned application Ser. No. 08/656,007, filed May 24, 1996, by R. J. McMillen et al., and entitled "RECONFIGURABLE, FAULT TOLERANT, MULTI-STAGE INTERCONNECT NETWORK AND PROTOCOL", which is a continuation of U.S. Pat. No. 5,522,046, filed Jun. 3, 1994, by R. J. McMillen et al., entitled "RECONFIGURABLE, FAULT TOLERANT, MULTISTAGE INTERCONNECT NETWORK AND PROTOCOL" and issued May 28, 1996, which is a continuation of U.S. Pat. No. 5,321,813, filed May 1, 1991, by R. J. McMillen et al., entitled "RECONFIGURABLE, FAULT TOLERANT, MULTISTAGE INTERCONNECT NETWORK AND PROTOCOL", and issued Jun. 14, 1994, all of which are incorporated by reference herein.

BACKGROUND OF THE INVENTION

1. Field of the Invention

This invention relates in general to computer systems, and in particular, to a distributed multi-fabric interconnect for massively parallel processing computer systems.

2. Description of Related Art

An interconnection network is the key element in a Massively Parallel Processing (MPP) system that distinguishes the system from other types of computers. An interconnection network, or just interconnect, refers to the collection of hardware and software that form the subsystem through which the processors communicate with each other.

An interconnect is comprised of Processor/Network (P/N) interfaces and one or more switching fabrics. A switching fabric comprises a collection of, switching elements, or switches, and links. Each switching element contains a minimum of three I/O ports: two or more inputs and one or more outputs, or one or more inputs and two or more outputs. Said element also contains a means for dynamically establishing arbitrary connections between inputs and outputs under the control of a routing mechanism. Each link establishes a permanent connection between the output of one switching element (or P/N interface) and the input of another. The pattern of connections formed by links and switches define the topology of the fabric.

Practical implementations favor modularity. Hence, typical switching elements have equal numbers of inputs and outputs, fabrics exhibit regular geometric (mathematically definable) topologies, and multiple fabrics in an interconnect are usually identical. For reasons of performance, switches typically have a crossbar construction in which all outputs can be simultaneously connected to different inputs.

The performance of the interconnect is either limited by the speed of the links between the switches or the speed of the switches themselves. Current semiconductor technology limits the speed of the links and the physical distance between the switching elements. The speed of the switches is limited by semiconductor technology and the complexity of the design.

One means to overcome these speed limitations is to increase the number of fabrics in the interconnect. This multiplies bandwidth and has the benefit of providing multiple paths between every pair of end points. Ordinarily, this approach would expand the physical size of a given implementation, increase the number of cables, and increase the cost. It would also require more I/O ports in each processor, which may not be available. Perhaps most importantly, the interface software may not be designed to utilize multiple fabrics, and depending on the implementation, the software may or may not be readily modified to accommodate such a change.

The scalability of the MPP system is also an important characteristic. Not only must connectivity scale, but performance must scale linearly as well. The MPP system size demanded by customers can vary from two to 1024 or more processing nodes, where each node may contain one or more processors. It is essential that the interconnect be able to grow in size incrementally. It is undesirable but common for MPP interconnects to double in size to accommodate the addition of one processing node as the total number of ports required crosses powers of two (e.g., an interconnect with 128 ports is required to support 65 processing nodes, which is at least twice as much hardware as 64 nodes require, depending on the topology used).

Another problem with MPP systems results from the commoditization of processor hardware. Computer system manufacturers no longer design all the elements of the systems they produce. In particular, MPP systems are typically comprised of large collections of processor/memory subsystems made by other manufacturers. Access to the processor is limited to the provided I/O bus, and it is generally no longer possible to gain access via the processor/memory bus. The I/O bus typically operates at a fraction of the speed of the processor/memory bus; however, multiple I/O busses are often provided. This situation favors interconnects that exploit parallelism rather than single, very high bandwidth interconnects.

There are two basic approaches that have been used in prior designs of MPP systems. The first is centralized, in which all switching fabric hardware is housed in one physical location. Cables must be run from the P/N interface in each processing node to each fabric in the interconnect. In cases where there is more than one fabric, usually for providing fault tolerance, each fabric is centralized with respect to the processing nodes and independent of the other. Providing more fabrics using this arrangement multiplies all the hardware, cables and cost.

The other approach is distributed, in which portions of the switching fabric are physically distributed among the processing nodes. An example of this is the Y-Net interconnect used in the Teradata™ DBC 1012 and NCR™ 3600 systems. This is also a popular arrangement for mesh and hypercube interconnects.

If the fabric is replicated for fault tolerance, each of the individual submodules and cables are duplicated. Since the packaging typically allocates a fixed amount of space for the portion of the fabric that coexists with each processing node, replicating fabrics to increase performance requires a redesign of the system packaging. In the case of typical mesh and hypercube interconnects, one switch is an integral part of the processor electronics, and is often co-located on the same board. Replicating the fabric is completely impractical, requiring the redesign of boards and packaging.

Thus, there is a need in the art for designs that improve performance through fabric replication in a cost-effective manner. There is also a need in the art for designs that lead to reduction of the cable count in MPP systems, and also eases the installation effort. Finally, there is a need in the art for designs that distribute the implementation of the interconnect, so that the switching hardware can consume otherwise unused space, power, and cooling resources by being co-located with processor hardware.

SUMMARY OF THE INVENTION

To overcome the limitations in the prior art described above, and to overcome other limitations that will become apparent upon reading and understanding the present specification, the present invention discloses an interconnect network having a plurality of identical fabrics that partitions the switching elements of the fabrics, so that many links can be combined into single cables. In the partition, one or more of the switching elements from the first stage of each of the fabrics are physically packaged on to the same board called a concentrator, and these concentrators are physically distributed among the processing nodes connected to the interconnect network. The concentrator allows all the links from each processing node to a concentrator, each of which need to be connected to different fabrics, to be combined into a single cable. Furthermore, the concentrator allows all the links from a single switching element in the first stage to be combined into a single cable to be connected to the subsequent or expansion (second and higher) stages of the fabric. The subsequent or expansion stages of each fabric can be implemented independently of other fabrics in a centralized location.

BRIEF DESCRIPTION OF THE DRAWINGS

Referring now to the drawings in which like reference numbers represent corresponding parts throughout:

FIG. 2 illustrates a multistage fabric constructed from a×b switching elements, wherein a, b, and n are positive integers and a+b≧3;

DETAILED DESCRIPTION OF THE PREFERRED EMBODIMENT

Figure 1A:
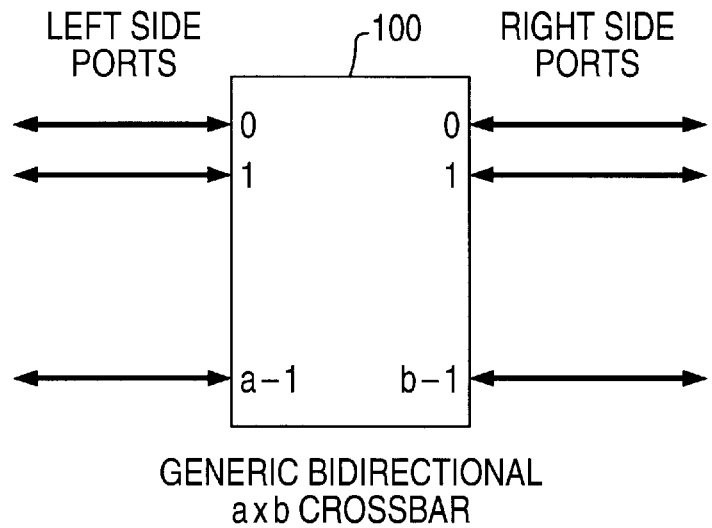
FIG. 1A illustrates a generic bidirectional a×b crossbar switching element and FIGS. 1B, 1C, and 1D illustrate three possible implementations of the element.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes a method for partitioning the switching elements of multiple fabrics, so that many links can be combined into single cables, thereby enabling higher density packaging and making the implementation of multiple fabrics practical. The partitioning method disclosed is applicable to any multistage interconnect constructed from a×b bidirectional switching elements, where a>1, b>0 or a>0, b>1. According the present invention, one or more of the switching elements from the first stage of each of several identical fabrics are physically packaged on to the same board called a concentrator, and these concentrators are physically distributed among the processing nodes.

This concentrator approach allows all the links from each processing node to a concentrator, each of which need to be connected to different fabrics, to be combined into a single cable. Furthermore, it allows all the links emanating from a single switching element in the first stage to be combined into a single cable to be connected to the second and subsequent stages of that fabric in larger configurations.

The subsequent or expansion stages (second and higher) of each fabric can be implemented independently of other fabrics in a centralized location. This partitioning of the collection of all the fabrics in the interconnect is what leads to all the benefits that have been described.

Since it is typically the physical size of the cable connectors that limits the packaging density of interconnects, not the switching electronics, this leads to high density packaging of individual fabrics, allowing cost-effective deployment of multi-fabric interconnects.

Massively Parallel Processing System

Without loss of generality, a typical MPP system can be considered to be comprised of an interconnection network, a number of processing nodes, and mass storage attached to the nodes. In an architecture in which storage is attached to the interconnect, storage can be considered just another node from the point of view of the interconnect.

In highly reliable interconnect implementations, two fabrics are provided for redundancy. If both fabrics are active, higher performance also results.

The partitioning method taught by this invention is broadly applicable to a very large class of interconnects. To characterize those for which it is suitable, the following parameters are defined. The basic building block is assumed to be an a port by b port, or a×b, bidirectional switching element, where a>1, b>0(or a>0, b>1). By convention, it is assumed that, logically, the a ports are on the left side of the switching element and the b ports are on the right side of the switching element.

Figure 1B:
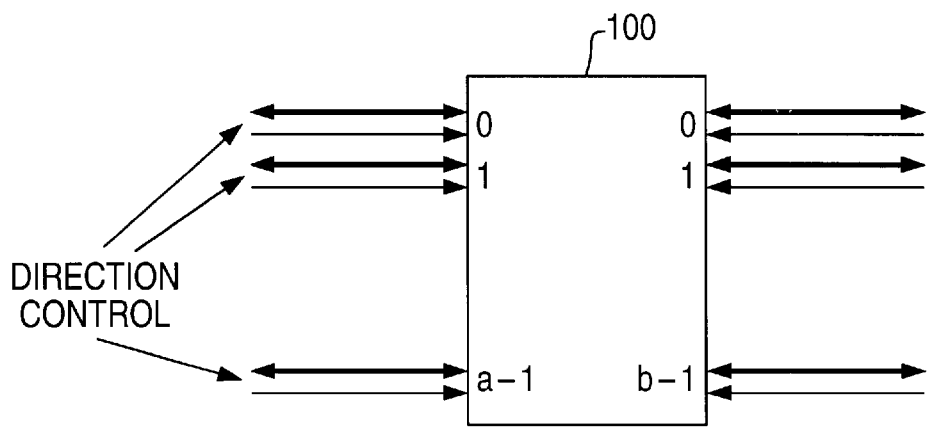
Figure 1C:
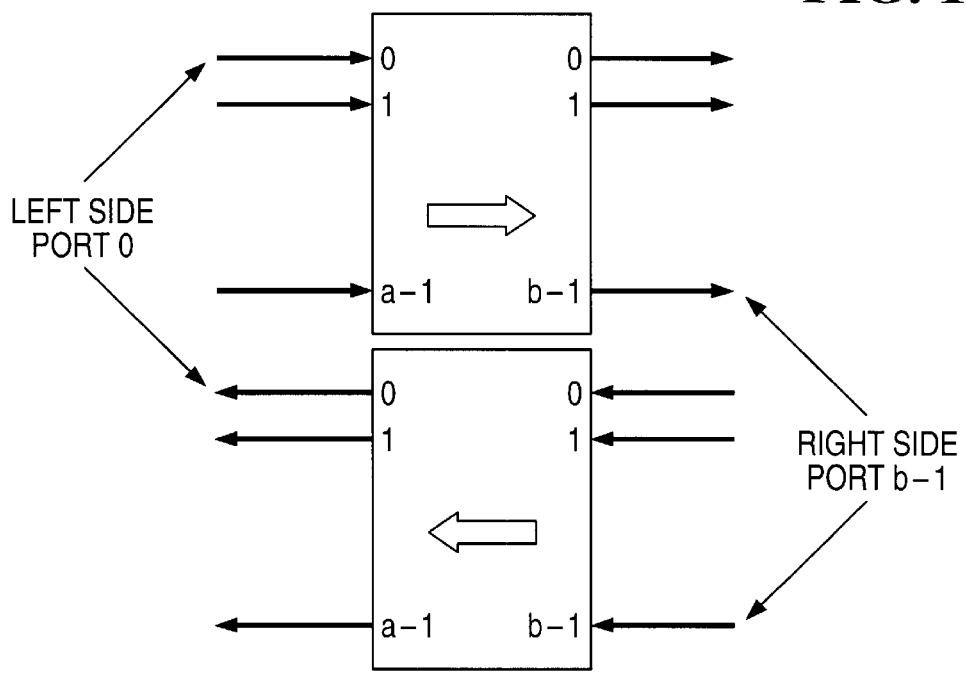
Figure 1D:
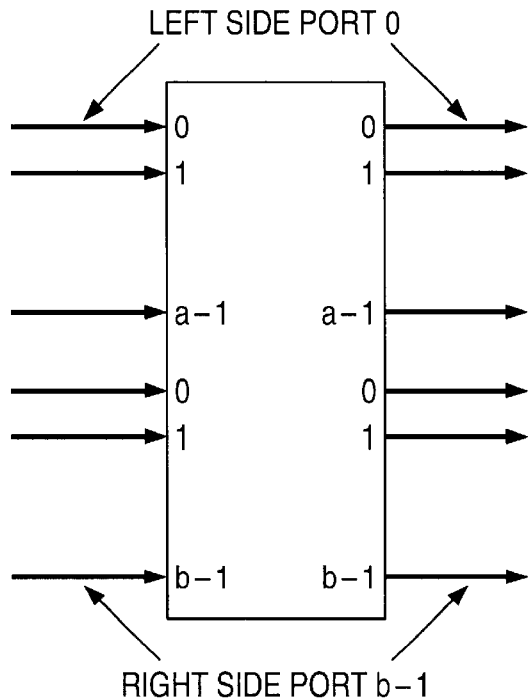

FIG. 1A illustrates a generic bidirectional a×b crossbar switching element 100 and FIGS. 1B, 1C, and 1D illustrate three possible implementations of the element. Each port of the element 100 is a bidirectional port that can either be comprised of (1) a single physical port that can move data in either direction under the control of an associated direction control line and is designated TYPE I (FIG. 1B); or (2) can be implemented as independent input and output ports and is designated TYPE II (FIGS. 1C and 1D).

Furthermore, TYPE II switching elements can be implemented in two different ways. The first, designated TYPE IIa (FIG. 1C), uses two unidirectional switching elements, one with a input ports by b output ports, or a×b, and the other, with b input ports by a output ports, or b×a.

The second, designated TYPE IIb (FIG. 1D), uses an (a+b)×(a+b) unidirectional switching element. It can be arranged to behave as an a×b bidirectional switching element. To do so, a input ports and a output ports are associated with the left side and b input ports and b output ports are associated with the right side. The second form simply has a+b bidirectional ports, a on the left and b on the right. This implementation allows a message's path to turn around at any stage because any input port, i, can be connected to output port, i.

If a=b, it is equally meaningful to assume an a×b unidirectional crossbar for a switching element. In that case, all left ports are inputs and all right ports are outputs. Each processor node must then interface to one input port on the left side of the fabric and one output port on the right side of the fabric. Except where noted below, subsequent discussion assumes generic a×b switching elements and is implementation independent.

Two Fabric Forms

FIG. 2 illustrates a fabric 200 constructed from a×b switching elements, wherein a, b, and n are positive integers, a+b≧3. Such a fabric 200 can take one of two forms.

The first form, designated FORM I, uses only the left side ports of the left most stage for external connection to processing (or other) nodes. The right side ports of the right most stage use a "loop-back" mode, automatically sending any message reaching the right side of the fabric back in the direction from which it came. All messages in such a fabric 200 implemented with TYPE IIa switching elements will always pass through the loop-back connections in the right most stage. In these fabrics 200, there are as many paths between any pair of left side ports as there are right side ports. Hence, these fabrics 200 are highly fault tolerant. If TYPE IIb switching elements are implemented, messages in FORM I fabrics 200 may turn around before reaching the loop-back stage.

The second form, FORM II, use both sides of the fabric 200 for external connection to processor (or other) nodes. When used this way, it is more efficient to use either TYPE I or TYPE IIb switching elements which allow early turn-around to minimize the path length of messages entering and exiting the same side of the fabric 200.

Topology Characterization

Any interconnection network with K fabrics, K>1, where the fabrics use a multistage topology constructed from the a×b switching elements (as defined above), can benefit from the partitioning method described herein. A very useful and practical to implement subset of all possible such interconnects can be characterized as follows.

Assume that all fabrics are identical and that the total number of left side bidirectional ports per fabric is N, where the ports are numbered from 0 to N−1. The number of stages in each fabric is $n=\lceil \log_a(N) \rceil$, numbered from 0 to n−1, left to right. The ceiling function, indicated by $\lceil \ \rceil$, assures an integer number of stages. If N is not a power of a, then the fabric will have $a^n$ left side ports which can be reduced by pruning ports and switches until there are N total ports. Because this can be done, for the remainder of the discussion, it will be assumed that N is a power of a, i.e., $N=a^n$, n>0.

The first stage of each fabric requires N/a or $a^{n-1}$ switching elements, numbered from 0 to $a^{n-1}-1$ (see FIG. 2). It has $a^n$ left side ports and $a^{n-1}b$ right side ports. The $i^{th}$ stage, 0≦i<n, has $a^{n-i-1}b^i$ switching elements, $a^{n-i}b^i$ left side ports and $a^{n-i-1}b^{i+1}$ right side ports. The n−1$^{st}$ or last stage has $b^{n-1}$ switching elements, $ab^{n-1}$ left side ports and $b^n$ right side ports. (Depending on the form of the interconnect, there are either $b^n$ loop-back points, or $b^n$ I/O ports for external connection to processor or other nodes.)

There are two methods for referencing a specific I/O port on a specific switching element. The first method is by (Stage:Level) and the second method is by the triplet (Stage:Switch-Element-Number:Switch-Element-Port-Number).

Let i represent the stage number, 0≦i<n. Let $X_i^{right}$ represent the level of a right side port in the $i^{th}$ stage, then X can be represented by a combination of a-ary and b-ary digits as follows. Let α represent an a-ary digit whose value ranges from 0 to a−1 and β represent a b-ary digit whose value ranges from 0 to b−1, then $X_i^{right}=[\alpha_{n-i-2} \ldots \alpha_1\alpha_0\beta_i \ldots \beta_1\beta_0]$. Such a notation is referred to as a mixed radix representation.

For notational convenience, digits of the same arity are grouped together; however, the only requirement is that the least significant digit of a right side level must be b-ary (i.e., a β). The other digits can appear in any order; however, the same order should be used to identify every level in the same stage. A left side port in the $i^{th}$ stage is represented as: $X_i^{left}=[\beta_{i-1} \ldots \beta_1\beta_0\alpha_{n-i-1} \ldots \alpha_1\alpha_0]$. In this case, the least significant digit must be an α.

The number of right side ports in stage j must be equal to the number of left side ports in stage j+1 so that a permutation of the links can be formed. That is equivalent to determining that the maximum value representable by each X is the same. Thus, the relationship, $MAX(X_j^{right})=MAX(X_{j+1}^{left})$, 0≦j<n−1, must be true. The following conversion formula can be used to verify that this is true:

$$X = [\beta_p \ldots \beta_1\beta_0\alpha_q \ldots \alpha_1\alpha_0] = \sum_{j=0}^{p}\beta_j b^j a^{q+1} + \sum_{j=0}^{q}\alpha_j a^j$$

This is a radix conversion formula in which base r is implicitly used to compute the weighted sum of the mixed radix digits representing X. Base r is typically 10, but any base could be used. Just as the maximum value of a four digit base 10 number is represented by setting all the digits to "9," the maximum value of $X_j^{right}$ and $X_{j+1}^{left}$ can be evaluated by setting $\beta_j=b-1$, 0≦j≦i, and $\alpha_j=a-1$, 0≦j≦n−i−2, in each mixed radix representation, respectively. This yields the following relationship to be verified:

$$\sum_{j=0}^{n-i-2}(a-1)a^j b^{i+1} + \sum_{j=0}^{i}(b-1)b^j \stackrel{?}{=} \sum_{j=0}^{i}(b-1)b^j a^{n-i-1} + \sum_{j=0}^{n-i-2}(a-1)a^j$$

Using the fact that $$\sum_{k=0}^{p}d^k = \frac{d^{p+1}-1}{d-1},$$

d and p any positive integers, the above relationship is simplified to:

$$(a-1)b^{i+1}\frac{a^{n-i-1}-1}{a-1} + (b-1)\frac{b^{i+1}-1}{b-1} \stackrel{?}{=}$$

$$(b-1)a^{n-i-1}\frac{b^{i+1}-1}{b-1} + (a-1)\frac{a^{n-i-1}-1}{a-1}$$

It can be readily verified that both equations reduce to $a^{n-i-1}b^{i+1}-1$. Since counting starts at 0, this means there are $a^{n-i-1}b^{i+1}$ total links between stages i and i+1 as was stated earlier. Furthermore, it can be shown that this is true for any permutation of the mixed radix digits.

To reference a specific left side I/O port on a specific switching element using the first method, the notation (i: $\beta_{i-1} \ldots \beta_1\beta_0\alpha_{n-i-1} \ldots \alpha_1\alpha_0)_{left}$ is used, and by the second method, (i: $\beta_{i-1} \ldots \beta_1 B_0\alpha_{n-i-1} \ldots \alpha_1: \alpha_0)_{left}$. Note that the switch element number would be evaluated as $$\beta_{i-1} \ldots \beta_1\beta_0\alpha_{n-i-1} \ldots \alpha_1 = \sum_{j=0}^{i-1} \beta_j b^j a^{n-i-1} + \sum_{j=1}^{n-i-1} \alpha_j a^{j-1}.$$

The formula has been modified to take into account the fact that the α subscripts start at j=1, not 0, so the proper power of a is used. In a similar fashion, for a right side port, the first method specifies (i: $\alpha_{n-i-2} \ldots \alpha_1\alpha_0\beta_i \ldots \beta_1\beta_0)_{right}$, and the second, (i: $\alpha_{n-i-2} \ldots \alpha_1\alpha_0\beta_i \ldots \beta_1: \beta_0)_{right}$.

For a given value of i, if the subscript of any digit evaluates to a negative number, none of the digits of that radix exist in that number. Also, the subscript expression containing i is the highest order digit of that radix in the number.

As stated earlier, left side port numbers must end with an α radix digit and right side port numbers must end with a β radix digit. Because of this one to one relationship, where it is not essential for clarity, the "left" and "right" designations are omitted from some mixed radix representations.

Again, for notational convenience, the digits of each radix are grouped together and numbered from 0 to the number of digits required minus one. However, except for the least significant digit, all other digits can appear in the representation in any order, but their quantity cannot change.

To meet the requirement that any port can communicate with any other port, any multistage interconnect must be constructed in such a way that the address (level) of the entry port can be "transformed" into the address of the exit port. There is a one-to-one relationship between the transformation required and the path taken. When addresses are represented symbolically, the effect of passing through a switching element or moving from one stage to the next can be readily characterized.

Consider switch number S in stage i, $0 \leq i < n$, $0 \leq S < a^{n-i-1}b^i$. Using the triplet notation of the second method, it's left side port level is (i:S:α). Since α is the number (address) of the left entry port and the switch can connect that port to any right side port whose level is represented by (i:S:β), passing through the switch has the effect of transforming an α into a β.

Using the first method notation, this is equivalent, for example, to transforming (i:$\beta_{i-1} \ldots \beta_1\beta_0\alpha_{n-i-1} \ldots \alpha_1\alpha_0)_{left}$ into (i:$\beta_{i-1} \ldots \beta_1\beta_0\alpha_{n-i-1} \ldots \alpha_1\beta_i)_{right}$, that is, the least significant digit is converted from an α to a β. The higher order digits are preserved. Depending on the actual topology of the fabric, the higher order digits will be in some radix order, not necessarily that shown in this example. Whatever the order is, it will be preserved. To complete the transformation of the entire address, the permutation connections between stages must be designed so that every a in the original address is moved to the least significant digit position, one per stage. Upon exit from the right most stage of the fabric, every α in the original address will have been transformed into a β. (Assuming the implementation supports turning around at any stage, turn-around is allowed whenever the unprocessed higher order digits of the entry address match the same digits of the exit address, and there is no need to process those digits.)

It can be shown that the pattern of connections between each Stage can be completely specified by permuting the digits of the Level number. In the general case, for all X, $0 \leq X < a^{n-i-1}b^{i+1}$, the total set of switching element right side ports numbered (i: $\alpha_{n-i-2}^{n-1} \ldots \alpha_1^{i+2}\alpha_0^{i+1}\beta_i^i \ldots \beta_1^1\beta_0^0)_{right}$ are connected to the switching element left side ports numbered (i+1: $PERMUTE_i^n$ {($\alpha_{n-i-2}^{n-1} \ldots \alpha_1^{i+2}\alpha_0^{i+1}\beta_i^i \ldots \beta_1^1\beta_0^0)_{right}\})_{left}$. The permutation function is subscripted with an "i" to indicate that the function is associated with a specific Stage, and typically, is different in each Stage. The "n" superscript refers to the number of Stages in the interconnect. Superscripts have been added to indicate digit position. There are always n digits numbered from 0 to n-1. To be a valid permutation function, $PERMUTE_i^n$ must rearrange the digits in such a way that the least significant digit is always an α, meeting the requirement for representing a left side level and assuring that a new α is presented at each stage for transformation by the switching elements there into a β. For example, two digit permutations that start with ($\alpha_{n-i-2}^{n-1} \ldots \alpha_1^{i+2}\alpha_0^{i+1}\beta_i^i \ldots \beta_1^1\beta_0^0)_{right}$ and both place $\alpha_0^{i+1}$ in the least significant digit position are ($\beta_i^i \ldots \beta_1^1\beta_0^0\alpha_{n-i-2}^{n-1} \ldots \alpha_1^{i+2}\alpha_0^{i+1})_{left}$ and (($\alpha_{n-i-2}^{n-1} \ldots \alpha_1^{i+2}\beta_i^i \ldots \beta_1^1\beta_0^0\alpha_0^{i+1})_{left}$. Although they cause the same digit to be processed by switching elements in the i+1$^{st}$ stage, they have significantly different topologies.

To more clearly see the effect of these two mixed radix permutations, it is useful to introduce the concept of a tracer. A tracer can be used to track the movement of digits caused by applying a permutation. A tracer is constructed of a sequence of n digits which each represent the value of their original position in a mixed radix number. A tracer is simply the sequence of superscripts shown in the mixed radix representations, i.e., [(n-1),(n-2), . . . i, . . . 2,1,0].

For example, consider n=5 and i=2. Right side port numbers in stage 2 are represented by ($\alpha_1^4\alpha_0^3\beta_2^2\beta_1^1\beta_0^0)_{right}$. Digit number 3 (the fourth most significant digit) is $\alpha_0$. The two permutations are ($\beta_2^2\beta_1^1\beta_0^0\alpha_1^4\alpha_0^3)_{left}$ and ($\alpha_1^4\beta_2^2\beta_1^1\beta_0^0\alpha_0^3)_{left}$. The input tracer is [43210] (commas are omitted from the tracer when each digit position can be represented by a single decimal digit). The effect of the first permutation on this tracer produces [21043] and the second, [42103]. Tracers will be used in lieu of superscripts for notational simplicity. When the arity of a digit position is important to distinguish, the tracer digits will be subscripted with an α or a β to so indicate, e.g., [$4_\alpha 3_\alpha 2_\beta 1_\beta 0_\beta$] maps to [$2_\beta 1_\beta 0_\beta 4_\alpha 3_\alpha$] and [$4_\alpha 2_\beta 1_\beta 3_\alpha$], respectively.

Tracers can be used in different ways. One way is to illustrate the effect of a single permutation used in one stage, say stage i. In this case, the input tracer is "injected" at the right side ports of stage i and the resultant output tracer appears at the left side ports of stage i+1.

Another way is to show the effect of a switching element on a tracer. When [$4_\alpha 2_\beta 1_\beta 0_\beta 3_\alpha$] passes through a switching element, it becomes [$4_\alpha 2_\beta 1_\beta 0_\beta 3_\beta$]. None of the digits change position, the least significant digit is simply changed from an α to a β.

The third use of a tracer is to inject it into the left side ports of stage 0 and track its transformation as it passes through switching elements and the permutations between stages until it emerges from the right side ports in stage n−1. In this process, the tracer that emerges from one stage serves as input to the next, it is not reinitialized to be an input tracer. Hence, a tracer that started in stage 0 may look different when it arrives at the left side ports in stage i+1 than one that originated at the right side ports in stage i.

Three Fabric Types

The relationship between a and b can take three forms, each of which defines a different class of interconnect. If a<b, a trapezoidal shaped fabric is formed in which there are $b^n$ paths between every pair of $a^n$ fabric left side ports. When implemented as a FORM I fabric, there are more paths internal to the fabric than external. Assuming a message routing scheme that exploits this property, this class of fabrics would have less internal contention among messages which would produce lower latency and higher throughput. A FORM II version of this class would be suitable for an architecture in which storage is attached to the interconnect. In cases in which the ratio of storage nodes to processing nodes is greater than one, processor nodes would be attached to the left side and storage nodes to the right. If the converse were true, the attachment sides would be reversed.

If a>b, a fabric is formed that some in the literature have referred to as a "fat tree." If b=1, an a-ary tree results. If a=2, a classic binary tree is obtained. This class of fabrics is typically implemented as FORM I. The NCR Y-Net is an example of a FORM I binary tree.

The third and most common class is that in which a=b. In this case, the switching elements are "square" having equal numbers of ports on each side and thus, produce square fabrics. This class is a special case, because all digits used in numbers representing levels have the same arity or radix. This leads to simplification of the notation needed to describe the characteristics of this class of fabrics.

EXAMPLES

For a fabric in which n=1, only one a×b switching element is required, so no permutation functions are necessary.

If n=2, there are two stages and the fabric is $a^2 \times b^2$. There is only one permutation function possible between Stage 0 and Stage 1: $PERMUTE_0^2$ $\{\alpha_0\beta_0\}=\beta_0\alpha_0$. The corresponding output tracer is [01].

If n=3, there are three stages and the fabric is $a^3 \times b^3$. Two permutation functions are needed: $PERMUTE_0^3$ $\{\alpha_1\alpha_0\beta_0\}$ and $PERMUTE_1^3$ $\{X\}$, where X is either in the form $\alpha_0\beta_1\beta_0$ or $\beta_1\alpha_0\beta_0$. Of the six possible digit permutations, there are four legal/useful possibilities for $PERMUTE_0^3$ $\{\alpha_1\alpha_0\beta_0\}$ (the input tracer is $[2_\alpha 1_\alpha 0_\beta]$): (I) $\alpha_1\beta_0\alpha_0$ ($[2_\alpha 0_\beta 1_\alpha]$); (II) $\alpha_0\beta_0\alpha_1$ ($[1_\alpha 0_\beta 2_\alpha]$); (III) $\beta_0\alpha_1\alpha_0$ ($[0_\beta 2_\alpha 1_\alpha]$); and (IV) $\beta_0\alpha_0\alpha_1$ ($[0_\beta 1_\alpha 2_\alpha]$). (All preceding tracers are single stage.) Notice that (I) and (II) are both of the form $\alpha\beta\alpha$. After passing through the switching element, they will both be of the form $\alpha\beta\beta$. Similarly, (III) and (IV) are of the form $\beta\alpha\alpha$ and will be converted by the switching element they enter to the form $\beta\alpha\beta$. The other two possible digit permutations are $\alpha_1\alpha_0\beta$ ($[2_\alpha 1_\alpha 0\beta]$) and $\alpha_0\alpha_1\beta_0$ ($[1_\alpha 2_\alpha 0_{62}]$).

If a≠b, these are both illegal because the least significant digit is a β. In this context, "illegal" means that even though the permutation produced is valid, the interconnect that results will not function correctly. There will be a mismatch between each set of b links these permutations group together for switching and the a ports available at the switch.

If a=b, the first of these is just the identity permutation which accomplishes nothing. The second is also not useful because the switching element from which this emanated just transformed that digit so it doesn't need to be processed again (unless it is desired to introduce redundant paths, but that option is outside the scope of this discussion).

Of the legal permutations, the first is preferred because $\alpha_1$ does not change position. That implies the worst case physical "distance" the links must span is minimal.

There are only two legal possibilities for $PERMUTE_1^3$ $\{X\}$, but which two depends on what was selected for $PERMUTE_0^3$ $\{X\}$. If either (II) or (II) was selected, so the mixed radix representation of the right side port level in stage 0 is of the form $\alpha\beta\beta$, then $PERMUTE_1^3$ $\{\alpha_0\beta_1\beta_0\}$ is either $\beta_1\beta_0\alpha_0$ ($[1_\beta 0_\beta 2_\alpha]$) or $\beta_0\beta_1\alpha_0$ ($[0_\beta 1_\beta 2_\alpha]$), neither of which has any particular advantage over the other. If either (III) or (IV) was selected, so the mixed radix representation of the right side port level in stage 0 is of the form $\beta\alpha\beta$, then $PERMUTE_1^3$ $\{\beta_1\alpha_0\beta_0\}$ is either $\beta_1\beta_0\alpha_0$ ($[2_\beta 0_\beta 1\beta]$) or $\beta_0\beta_1\alpha_0$ ($[0_\beta 2_\beta 1_\alpha]$).

The form of the mixed radix representation for the right side level number, i.e. the order in which the higher order (>0) digits appear at the right side ports, has a definite bearing on the topology generated in this stage. This is made clear by the tracers which track the movement of the digits. For example, even though $\beta_1\beta_0\alpha_0$ is a desired form of left side address (of switching elements in stage i+1) for all four possible $PERMUTE_0^3$ $\{X\}$ permutations, if the form of right side address (of switching elements in stage i) is $\alpha_0\beta_1\beta_0$, tracer $[1_\beta 0_\beta 2_\alpha]$ results. Whereas, if the right side address has form $\beta_1\alpha_0\beta_0$, tracer $[2_\beta 0_\beta 1_\alpha]$ results. The tracers show that the same $\beta\beta\alpha$ form is achieved, but the digits originate from different positions so different permutations are required.

These are distinct permutations, but it can be shown that they're topologically isomorphic. As stage numbers increase, there are fewer permutations to choose among because there are fewer unprocessed $\alpha$'s to move into the least significant digit position.

Suppose $PERMUTE_0^3$ $\{\alpha_1\alpha_0\beta_0\}=\beta_0\alpha_0\alpha_1$ and $PERMUTE_1^3$ $\{\beta_1\alpha_0\beta_0\}=\beta_1\beta_0\alpha_0$ are chosen as the two permutations to be implemented. The action of the switching elements (×) and permutations (→) can be observed by following a tracer from left side entry to right side exit as follows:

$[2_\alpha 1_\alpha \underline{0}_\alpha] \times [2_\alpha 1_\alpha 0_\beta] \rightarrow [0_\beta 1_\alpha \underline{2}_\alpha] \times [0_\beta 1_\alpha 2_\beta] \rightarrow [0_\beta 2_\beta \underline{1}_\alpha] \times [0_\beta 2_\beta 1_\beta]$ The underlined digits show the order in which the a's are processed, i.e., 0, 2, 1.

To see how a fabric is constructed according to these permutations, consider the case where a=2 and b=3. If $X_0$ is the level of a right side port in stage 0 and $Y_0$ is the level of a left side port in stage 1, then they each have $(2)^2 \cdot 3$ or 12 possible values that range from $0_{10}$ to $11_{10}$ (subscripts on numbers indicate their base or radix). $X_0$ is represented in mixed radix notation by ($\alpha_1\alpha_0\beta_0$) and $Y_0$ by ($\beta_0\alpha_0\alpha_1$). To see where the right side port at level $8_{10}$ is connected, permute the digits of its mixed radix representation, ($1_2 0_2 2_3$), as prescribed to obtain ($2_3 0_2 1_2$). That converts to left side level $9_{10}$. The complete range of values is shown in Table 1. The process for stage 1 is similar. In this case, $X_1$ and $Y_1$ have $(3)^2 \cdot 2$ or 18 possible values that range from $0_{10}$ to $17_{10}$. The permutation is enumerated in the Table.

Figure 3:
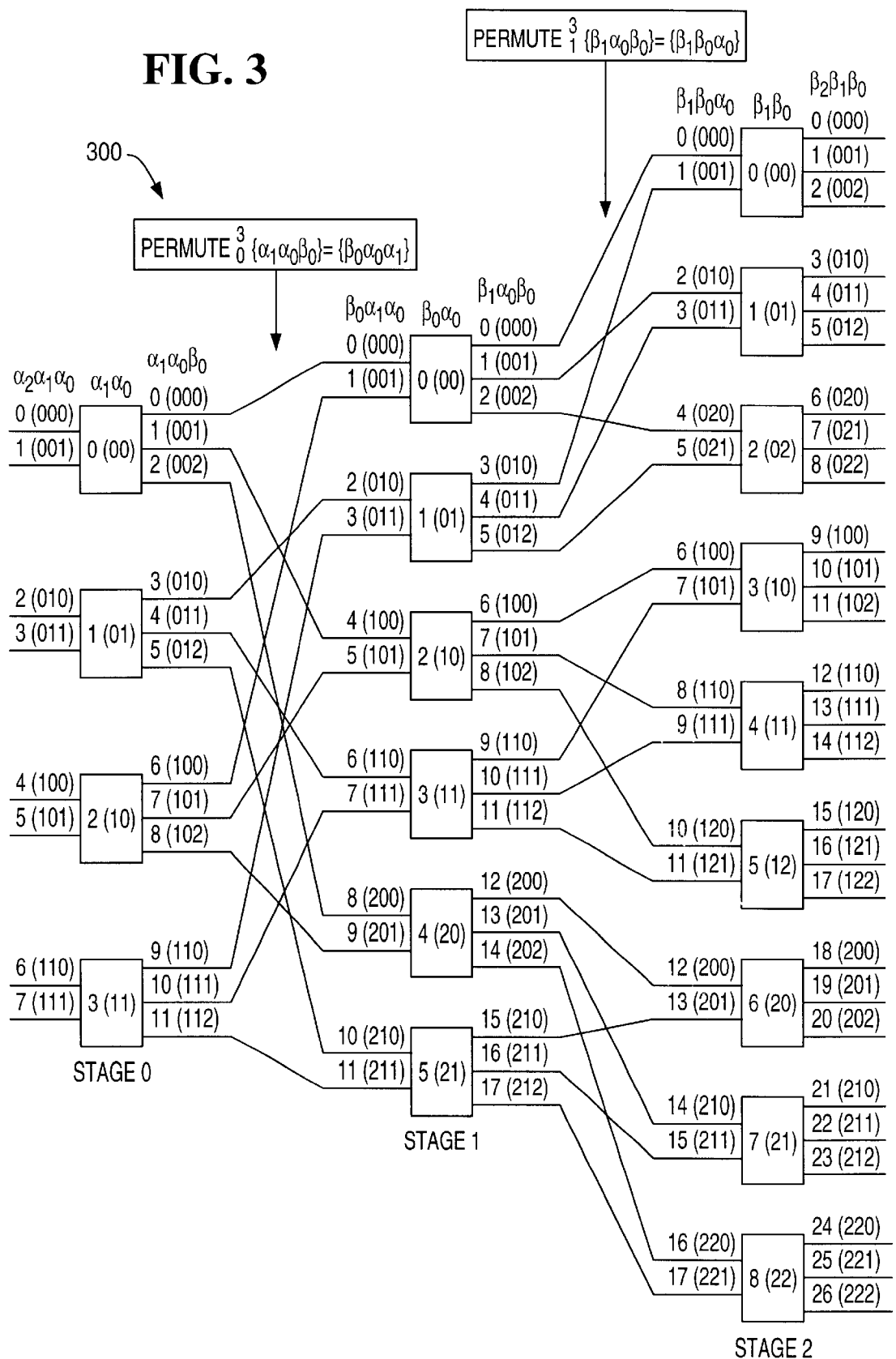
FIG. 3 illustrates an example of a three stage fabric constructed from 2×3 switching elements.

The resulting fabric is illustrated in FIG. 3, which illustrates an example of a three stage fabric 300 constructed from 2×3 switching elements. In FIG. 3, every port level and switching element level is numbered in both decimal and mixed radix notation, wherein the mixed radix notation is shown in parentheses. The radix type for each number is shown at the top of the stages in FIG. 3. Notice that in each stage, the first two digits of every left side and right side port level are identical to the two digits representing the level of the switching element to which they connect. The least significant digit of left side ports is always an a and of the right side, a β. This illustrates the equivalence of the two methods for numbering levels: (Stage: Level) and (Stage:Switch-Element-Number:Switch-Element-Port-Number). The permutation functions are also shown and it can be readily verified that the wiring patterns in stages 0 and 1 match the prescribed numberings from Table 1.

Partitioning for Cable Consolidation

In an interconnect with K fabrics, each processing node has K bidirectional links connecting it to the interconnect, with one link per fabric. Assuming the interconnect is implemented in a centralized fashion this provides an opportunity to consolidate the links into fewer cables (possibly one) depending on the value of K and the number of bidirectional links per cable, W, as selected technology permits. The number of cables per node, C, is $\lceil K/W \rceil$. Assume all the links associated with a node are bundled into a trunk, then each node side trunk, or N-trunk, contains $C_{N\text{-}trunk}$ cables.

Figure 4:
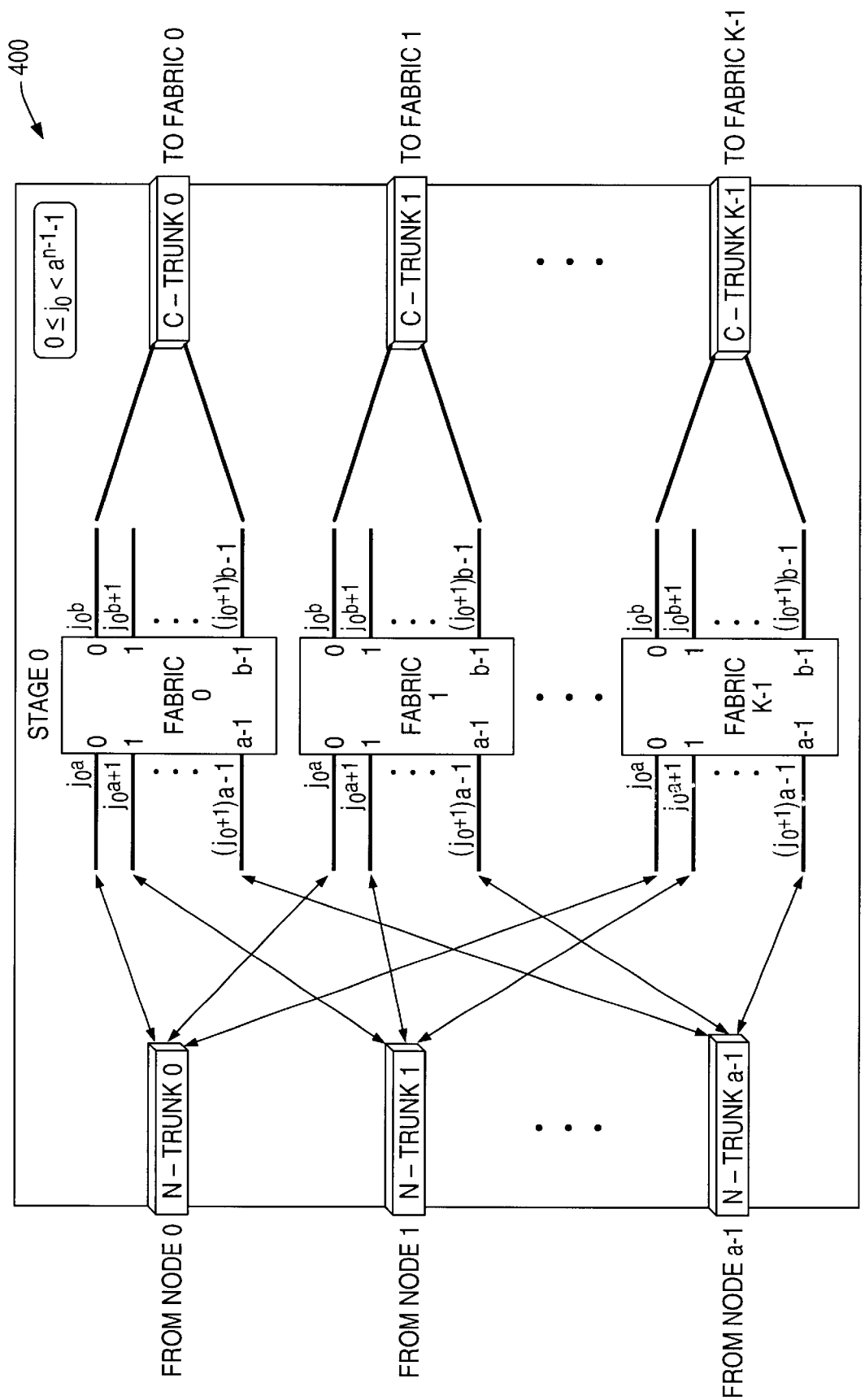
FIG. 4 illustrates a concentrator containing the $j_0^{th}$ stage 0 switching element from each of K different fabrics.

The problem with this approach is that it is impractical to distribute the K links to K different fabrics and at the same time implement the fabrics so that they scale up to very large numbers of ports, even for nominal values of K (e.g., as few as 4). The solution is to partition the interconnect so that each switching element $j_0$, $0 \leq j_0 < a^{n-1}$, in stage 0 is physically located with every other corresponding switching element $j_0$ from each other fabric. This creates $a^{n-1}$ concentrators. Each concentrator has a incoming N-trunks, each trunk containing K links on the left side and K outgoing concentrator-trunks, or C-trunks, each containing b links, on the right. This is illustrated in FIG. 4, which illustrates a concentrator 400 containing the $j_0^{th}$ stage 0 switching elements from each of K different fabrics. Each C-trunk contains $C_{C\text{-}trunk} = \lceil b/W \rceil$ cables. The crux of this is that all of the links in a C-trunk go to the same fabric. That means the remaining stages of each fabric can be implemented and physically packaged independent of the other fabrics. So, one function of a concentrator 400 is to accept N-trunks from multiple nodes and regroup them into multiple C-trunks that each connect to different fabrics. The concentrators 400 are also K self-contained fabrics for up to a nodes.

For small clusters of nodes, one concentrator is the entire interconnect. For large configurations, the concentrators reduce the number of cables needed to link clusters of nodes and concentrators to the centralized portion of the interconnect. If packaging constraints don't permit housing all K switching elements in one concentrator, multiple concentrators can be employed.

In general, the concentrators require a relatively small volume and can be colocated with the processing nodes. If $C_{N\text{-}trunk} > 1$ or $C_{C\text{-}trunk} > 1$, it may be appropriate to distribute the switching elements among $C_{N\text{-}trunk}$ or $C_{C\text{-}trunk}$ concentrators. The key point is that, technology permitting, there is the opportunity to reduce node cables by a factor of K and concentrator-to-central-switch cables by a factor of b. Since it is the connectors on the cables that tend to limit packaging density, this also enables higher density packaging of each fabric.

IMPLEMENTATION OF THE PREFERRED EMBODIMENT

Figure 5:
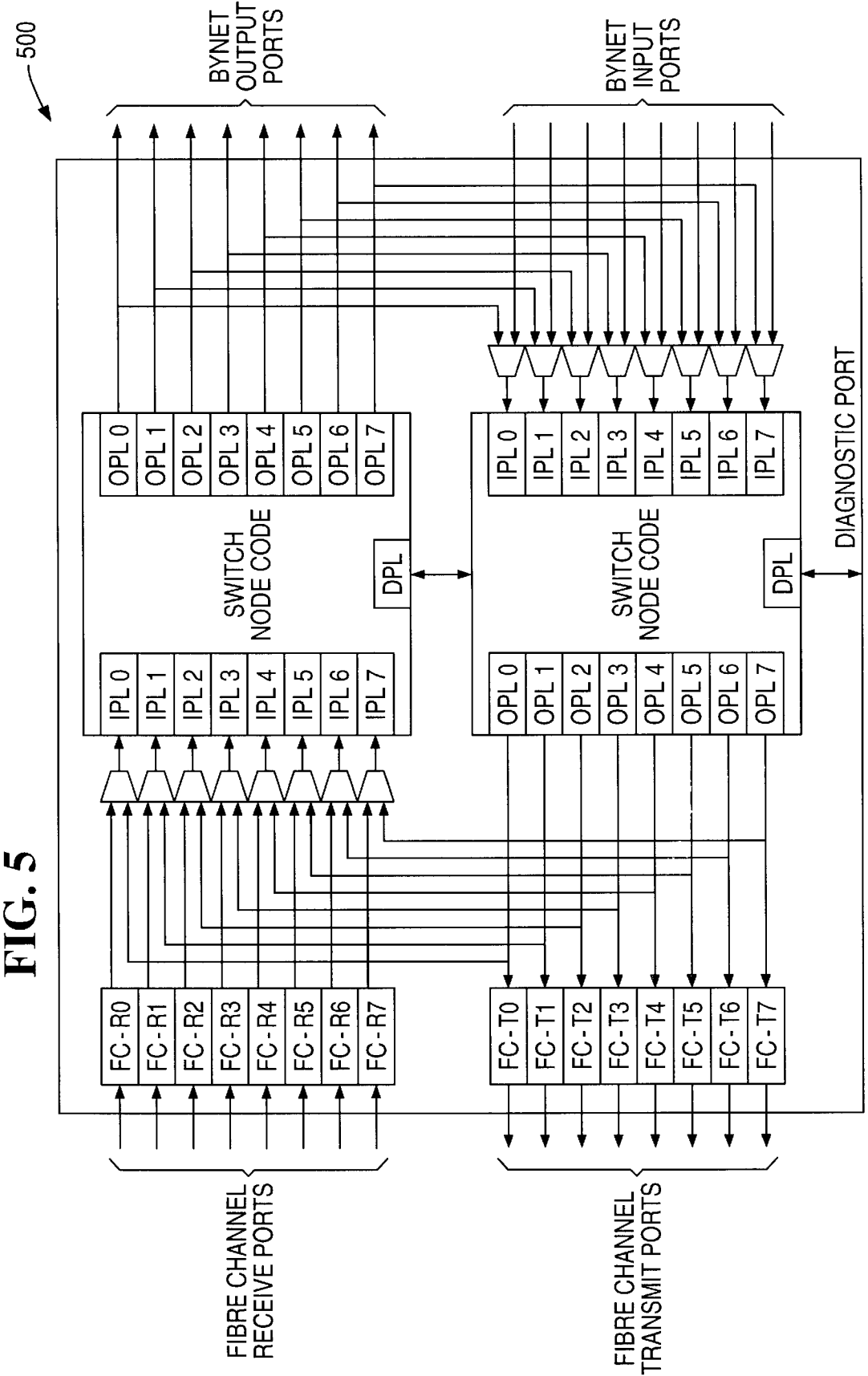
FIG. 5 illustrates a application-specific integrated circuit (ASIC) implementing a bidirectional switch node.

In the preferred embodiment, the basic building block in the interconnection network is an 8×8 unidirectional crossbar switch, wherein a=b=8. Two such switches are packaged into a single ASIC to form a bidirectional switch node (BiSN), as shown in FIG. 5. The BiSN 500 of FIG. 5 is a TYPE Ia switching element (see FIG. 1C) and includes Fibre Channel Receive Ports (labeled as FC-Rx), Fibre Channel Transmit Ports (labeled as FC-Tx), Input Port Logic (labeled as IPLx), Output Port Logic (labeled as OPLx), Diagnostic Port Logic (labeled as DPL), BYNET™ Output Ports, and BYNET™ Input Ports.

Selectable loop-back connections are provided internally, as illustrated in FIG. 5. In a preferred embodiment, some of the links that traverse short distances are parallel byte wide paths, while those that traverse longer distances are serial and use high speed Fibre Channel physical layer components and protocol.

These crossbar switches are cascaded in multiple stages to achieve the expanded connectivity for any number of processing nodes required by the system size. For example, one fabric in a system of 64 nodes would require 2 stages of 8 crossbar ASICs (16 crossbar ASICs) and one fabric in a system of 512 nodes would require 3 stages of 64 crossbar ASICs each (192 crossbar ASICs).

The crossbar switches are connected with a topology that allows communication between any two end points possible according to the methods described earlier. Current packaging technology requires the interconnect to be partitioned among multiple printed circuit boards, back planes and cabinets.

Figure 6:
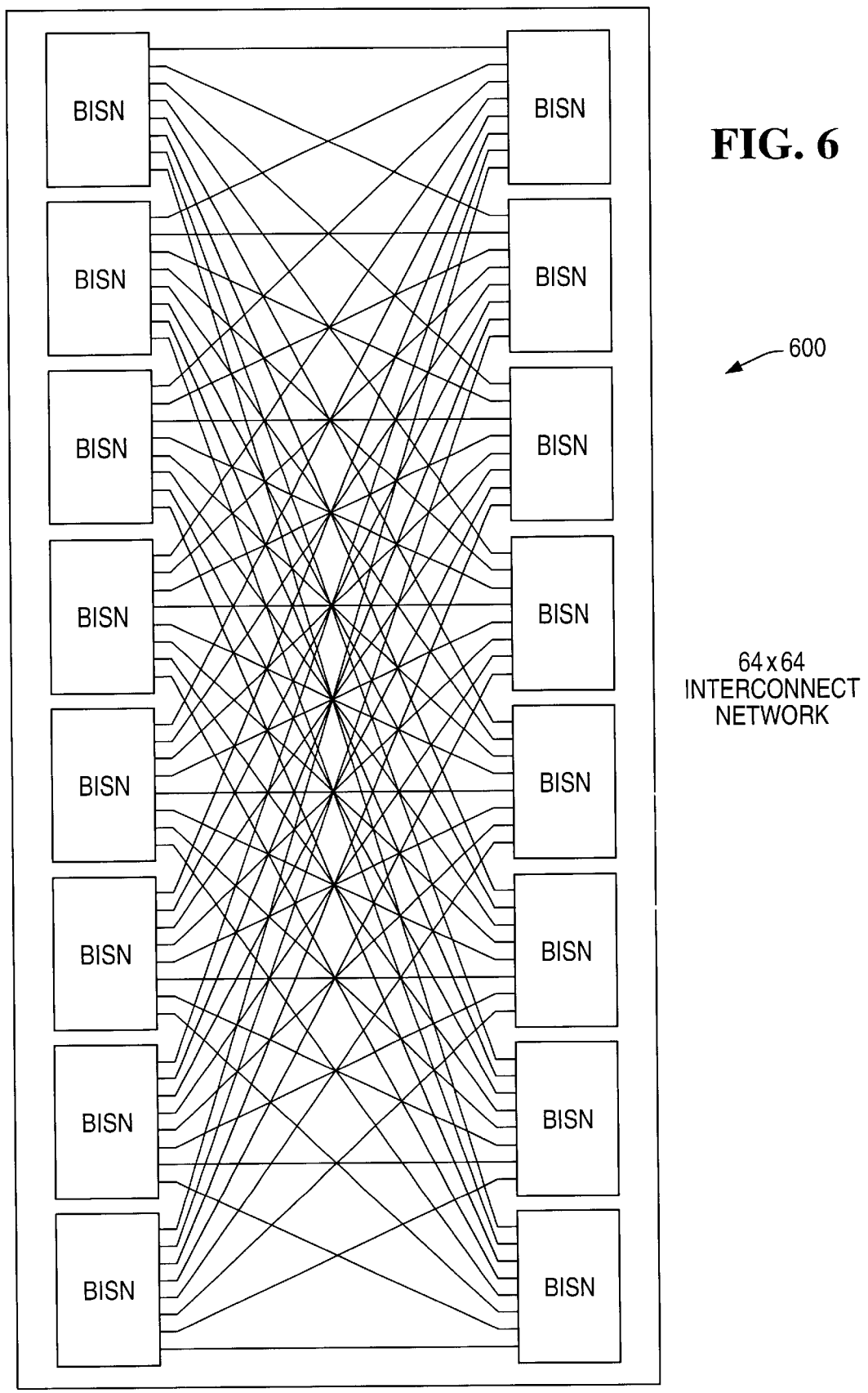
FIG. 6 illustrates a two stage interconnect implementing a folded banyan topology, which shows the typical logical interconnect wiring pattern of a 64 port MPP fabric.

FIG. 6 illustrates a two stage interconnect 600 implementing a folded banyan topology, which shows the typical logical interconnect 600 wiring pattern of a 64 port MPP fabric.

Figure 7:
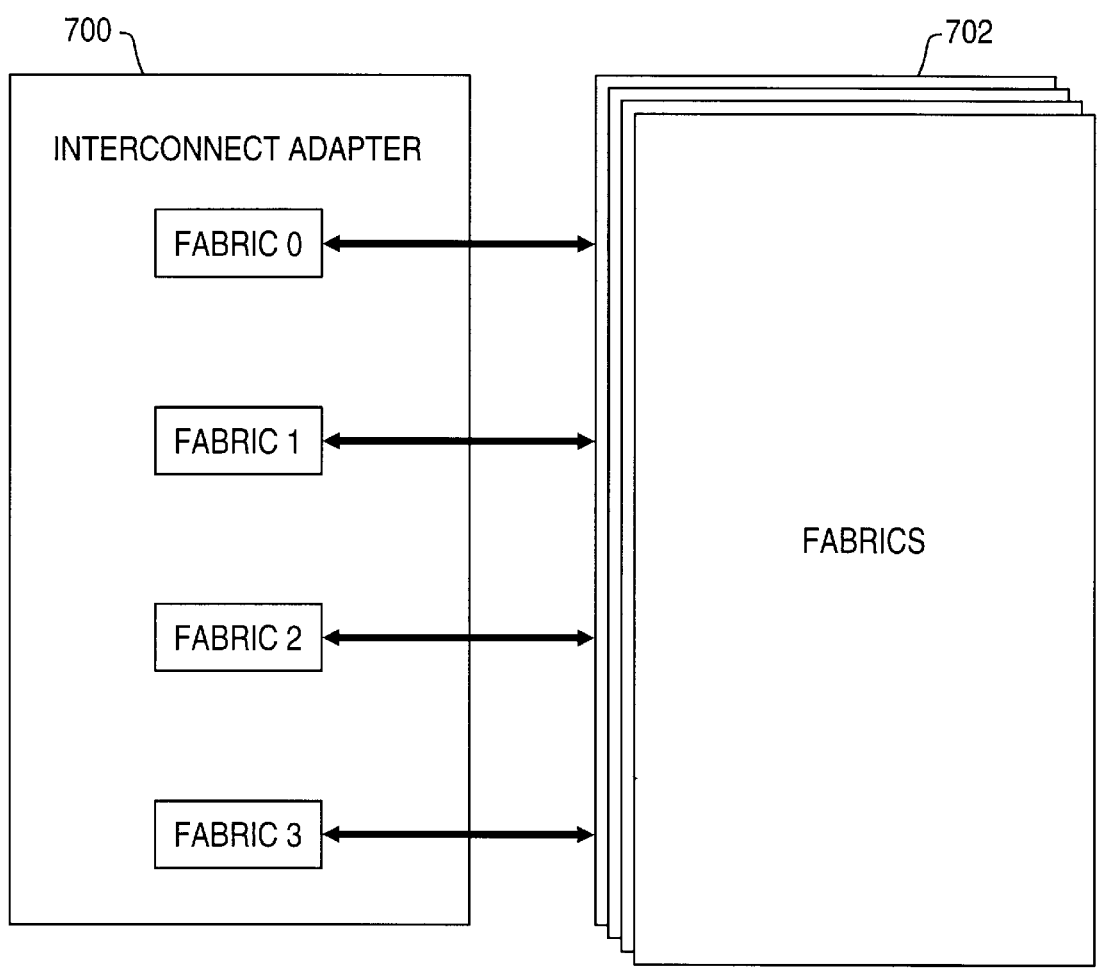
FIG. 7 shows the logical connection between the processing nodes and four fabrics.

FIG. 7 shows the logical connection between a processing node 700 and four fabrics 702.

For large configurations, cable management is a significant issue. Consider a 256 processing node system and a centralized interconnect with eight fabrics. There are 2048 cables, each typically 30 meters long. Depending on the density of the fabric implementation, 256 cables have to egress from the one to four cabinets per fabric. In this case, the density of each fabric is usually limited by the size of the connector used by each cable, not by the electronics.

Any attempt at cable reduction by placing multiple links into a single multi-conductor cable would require all fabrics to be physically interleaved. This is because the links associated with one processing node which are physically co-located, all go to different fabrics.

Given that each fabric must scale incrementally to very large sizes, it becomes impractical to meet that requirement for multiple fabrics that must be physically interleaved. The concentrator solves this problem by transforming the grouping of links from multiple fabrics per cable to multiple links from the same fabric per cable. This then allows the portion of each fabric beyond the first stage to be packaged independently of the others. The interconnect in a large system resides in multiple cabinets connected together with cables.

In the design described in the related applications, a 512 node system required 8 cabinets for one fabric. As the number of fabrics increases, the physical dimension of the interconnect networks expands significantly. The expanded dimension may make the distance between the processing node and the interconnect stretch beyond the limits permitted by the technology. The number of cables between the interconnect and the processing nodes also increases as a multiple of the number of fabrics.

The present invention reduces the number of cabinets and the cable counts by distributing the first stage of the interconnect networks. The 8×8 crossbar switches of the first stage of each fabric can be located on a new board type called a concentrator. Because the concentrator is small, it can occupy a chassis in the processor cabinet for an 8 node system or in a separate cabinet of multiple concentrators for the larger system.

Figure 8:
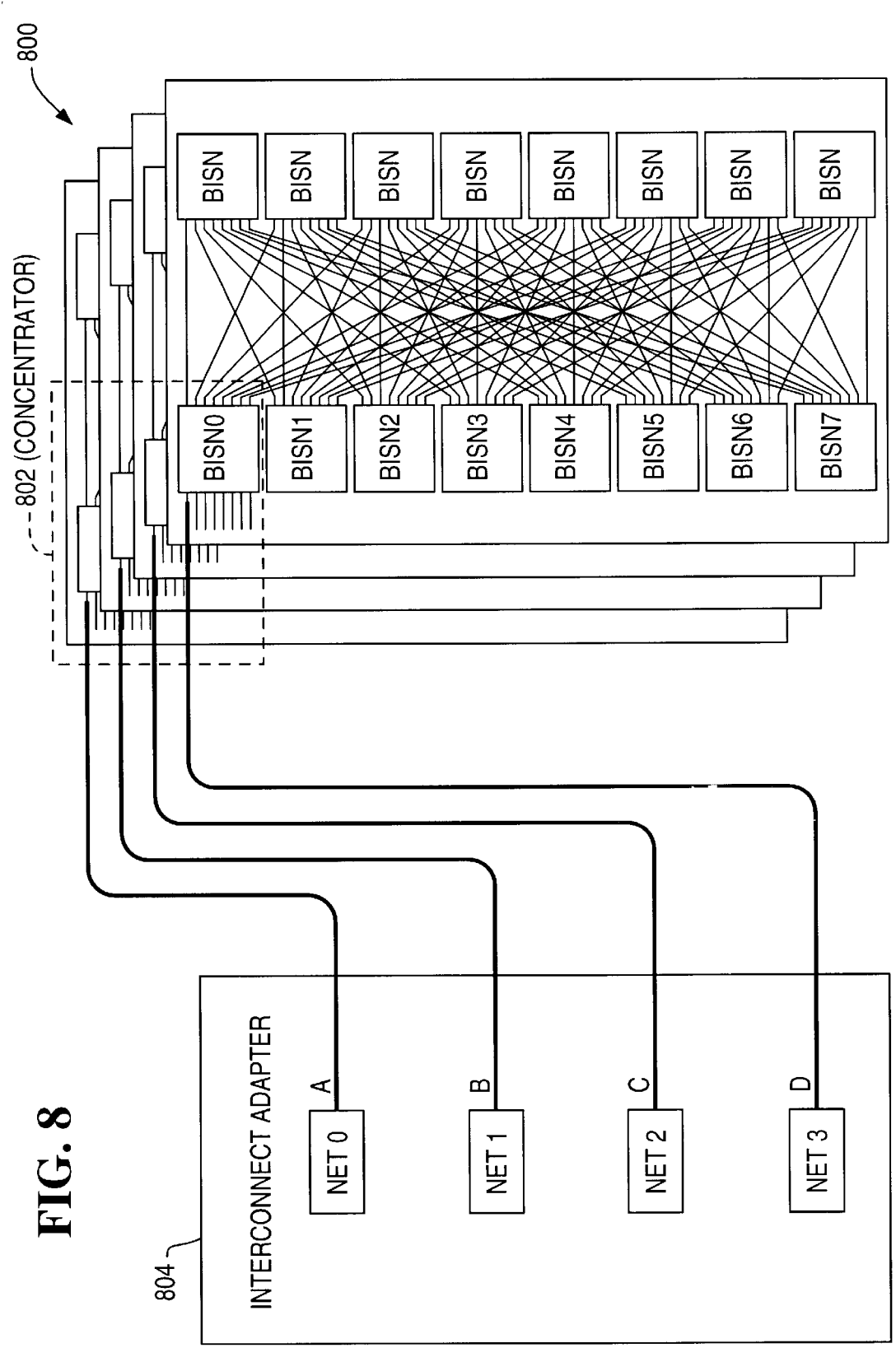
FIG. 8 illustrates the partitioning of switches from multiple fabrics to form a concentrator, and also shows the logical connections between a processing node and four fabrics.

FIG. 8 illustrates the partitioning of switches from multiple fabrics 800 to form a concentrator 802, and also shows the logical connections between a processing node 804 and the four fabrics 800. The dotted box representing the concentrator 802 separates the switch nodes labeled BISN0 in each fabric 800 and places them on one concentrator 802 board. The cables (labeled as A, B, C, D) from the processing node 804 to the concentrator 802 can now be bundled together to reduce the number of individual cables. This is possible because all cables come from the same physical source (the processing node 804) and terminate at the same physical destination (the concentrator 802). The 8 outputs from switch node BISN0 of each fabric 800 can also be bundled into one cable to go to the next stage. This distribution of the first stage replaces 4 long cables between the processing node 804 and the first stages of the four fabrics 800 with one cable. It also replaces the 8 cables between the first stage and the second stage with a single cable.

Figure 9:
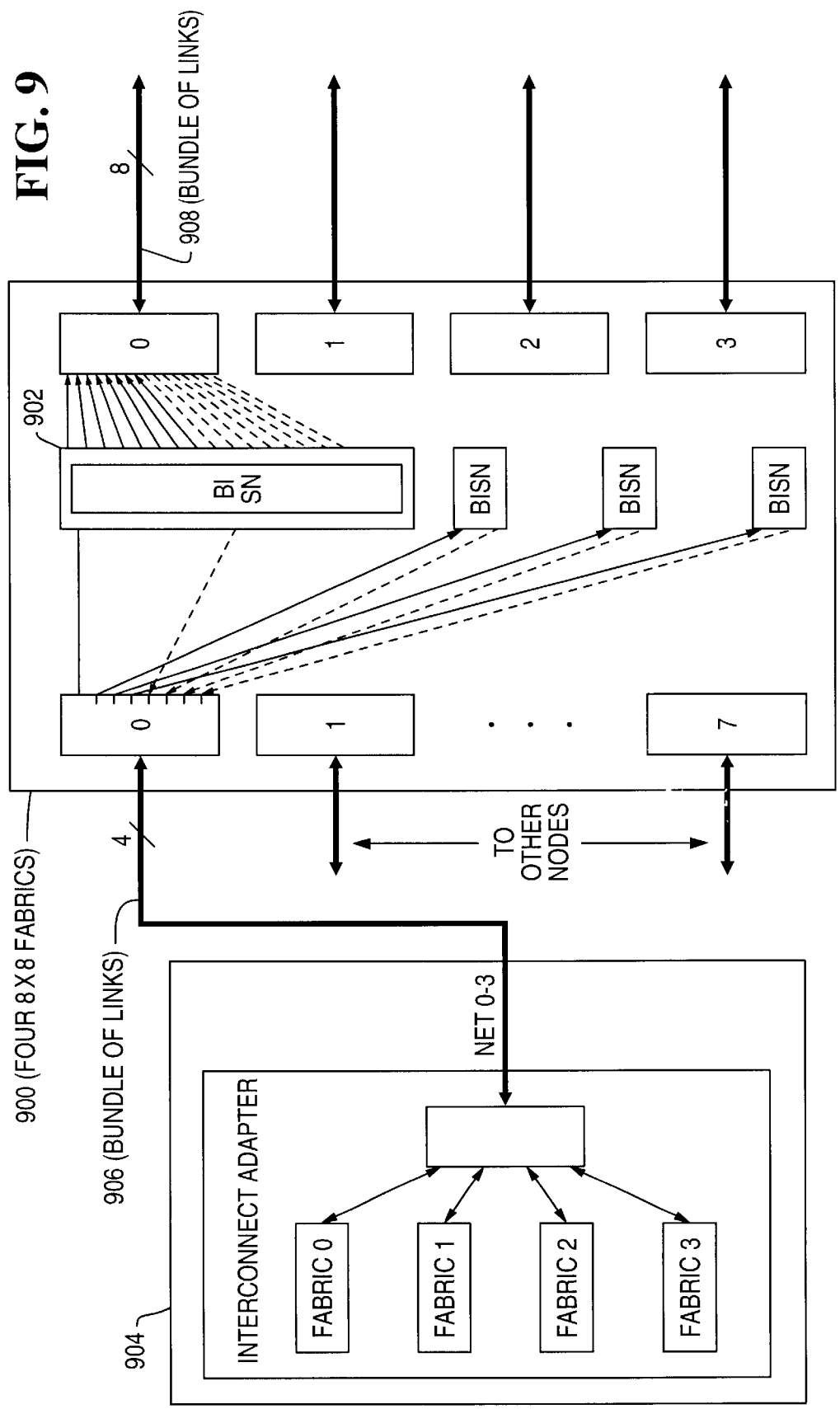
FIG. 9 illustrates a four fabric concentrator with 8×8 switching elements, including the arrangement of crossbar switches and wiring connection on the concentrator.

FIG. 9 illustrates a four fabric concentrator 900 with 8×8 switching elements 902, including the arrangement of crossbar switches and wiring connection on the concentrator 900. The four individual cables connecting the processing node 904 and the first stage switching elements 902 of the four fabrics (not shown) are now bundled into one cable 906 resulting in a 4-to-1 reduction in cables. On the concentrator 900, the bundles are redistributed and routed to the four crossbar switches 902 comprising the first stages of the four fabrics. The outputs of each switch node 902 are bundled together at 908 to connect to the second stage resulting in an 8-to-1 reduction in cables.

Figure 10:
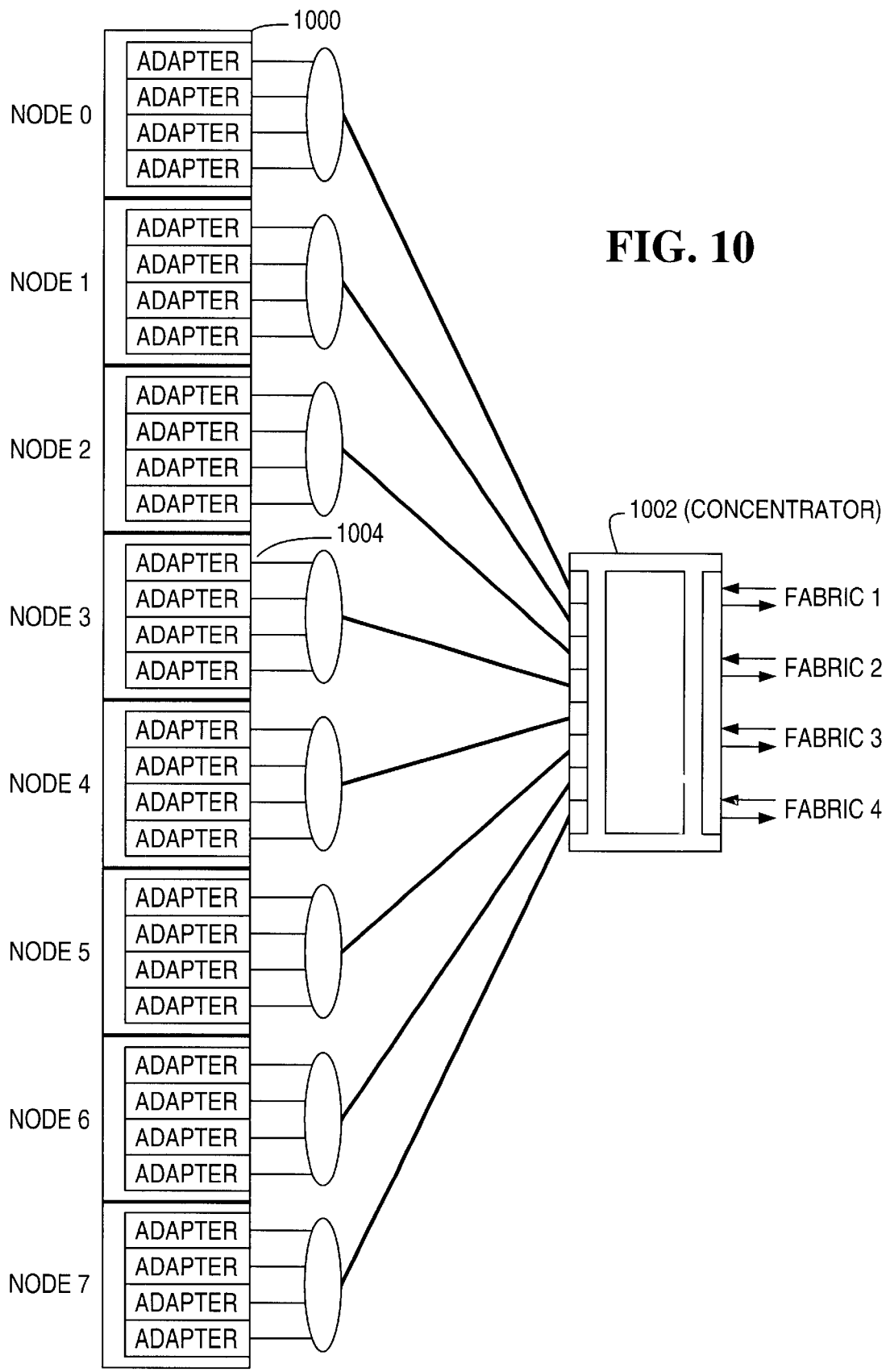
FIG. 10 illustrates the logical connection of an eight node cluster with a single concentrator of four fabrics.

FIG. 10 illustrates the logical connection of an eight node 1000 cluster communicating with a single concentrator 1002 for four fabrics (not shown). Each of the nodes 1000 uses a different adapter 1004 to communicate with a different one of the fabrics.

Figure 11:
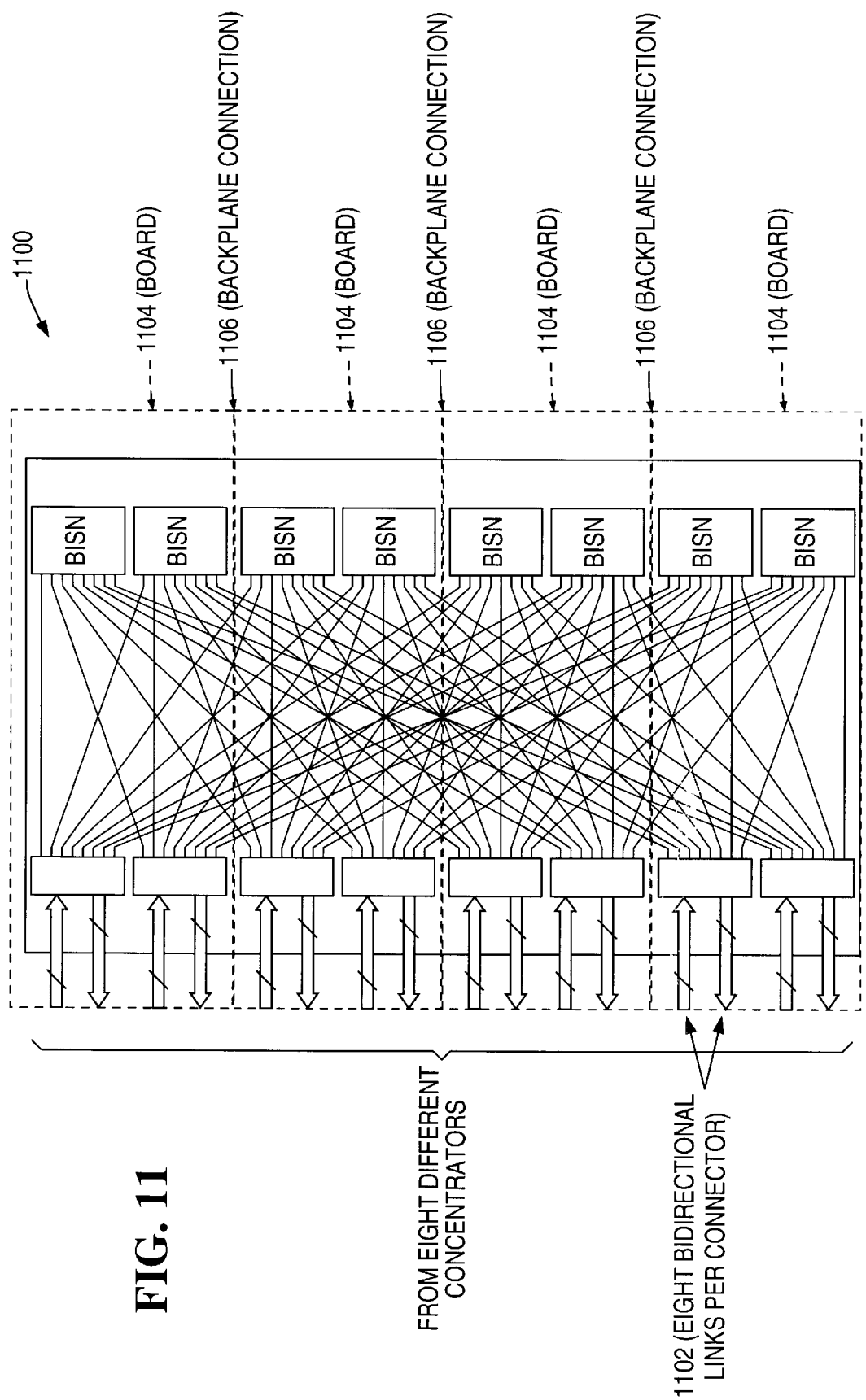
FIG. 11 shows the arrangement of crossbar switches and wiring connection for the second stage of a 64×64 port fabric wherein the second stage is divided into four printed circuit boards and they communicate with each other through a back plane.

FIG. 11 shows the arrangement of crossbar switches 1100 and wiring connection for the second stage of a 64×64 port fabric. The second stage is comprised of 8 different switching elements 1100 that communicate with 8 different concentrators (not shown) via 8 bidirectional links per connector 1102. The switching elements 1100 are paired together into four printed circuit boards 1104 that communicate with each other through aback plane 1106.

CONCLUSION

This concludes the description of the preferred embodiment of the invention. The following paragraph describes alternative embodiments for accomplishing the same invention.

The invention described herein is applicable to any multistage interconnection network constructed with K identical fabrics, K>1. Furthermore, each fabric is constructed from a×b switching elements, a>1, b>0 (or a>0, b>1). Although the interconnects most practical to implement are those constructed using the large class of topologies as taught above, the technique to be described is applicable to any multistage interconnect.

In summary, the present invention discloses an interconnect network having a plurality of identical fabrics, wherein the switching elements of the fabrics are partitioned, so that many links can be combined into single cables. In the partition, one or more of the switching elements from the first stage of each of the fabrics is physically packaged onto the same board called a concentrator, and these concentrators are physically distributed among the processing nodes connected to the interconnect network. The concentrator allows all the links from each processing node to a concentrator, each of which need to be connected to different fabrics, to be combined into a single cable. Furthermore, the concentrator allows all the links from a single switching element in the first stage to be combined into a single cable to be connected to the subsequent or expansion (second and higher) stages of the fabric. The subsequent or expansion stages of each fabric can be implemented independently of other fabrics in a centralized location.

The foregoing description of the preferred embodiment of the invention has been presented for the purposes of illustration and description. It is not intended to be exhaustive or to limit the invention to the precise form disclosed. Many modifications and variations are possible in light[]of the above teaching. It is intended that the scope of the invention be limited not by this detailed description, but rather by the claims appended hereto.

TABLE 1

Permutations for stages 0 and 1 of an interconnect constructed with 2 × 3 switching elements

| Stage 0 | | | | | | | | Stage 1 | | | | | | | |
|---|---|---|---|---|---|---|---|---|---|---|---|---|---|---|---|
| $X_0$ | ($\alpha_1$ | $\alpha_0$ | $\beta_0$) | → | ($\beta_0$ | $\alpha_0$ | $\alpha_1$) | $Y_0$ | $X_1$ | ($\beta_1$ | $\alpha_0$ | $\beta_0$) | → | ($\beta_1$ | $\beta_0$ | $\alpha_0$) | $Y_1$ |
| 0 | 0 | 0 | 0 | | 0 | 0 | 0 | 0 | 0 | 0 | 0 | 0 | | 0 | 0 | 0 | 0 |
| 1 | 0 | 0 | 1 | | 1 | 0 | 0 | 4 | 1 | 0 | 0 | 1 | | 0 | 1 | 0 | 2 |
| 2 | 0 | 0 | 2 | | 2 | 0 | 0 | 8 | 2 | 0 | 0 | 2 | | 0 | 2 | 0 | 4 |
| 3 | 0 | 1 | 0 | | 0 | 1 | 0 | 2 | 3 | 0 | 1 | 0 | | 0 | 0 | 1 | 1 |
| 4 | 0 | 1 | 1 | | 1 | 1 | 0 | 6 | 4 | 0 | 1 | 1 | | 0 | 1 | 1 | 3 |
| 5 | 0 | 1 | 2 | | 2 | 1 | 0 | 10 | 5 | 0 | 1 | 2 | | 0 | 2 | 1 | 5 |
| 6 | 1 | 0 | 0 | | 0 | 0 | 1 | 1 | 6 | 1 | 0 | 0 | | 1 | 0 | 0 | 6 |
| 7 | 1 | 0 | 1 | | 1 | 0 | 1 | 5 | 7 | 1 | 0 | 1 | | 1 | 1 | 0 | 8 |
| 8 | 1 | 0 | 2 | | 2 | 0 | 1 | 9 | 8 | 1 | 0 | 2 | | 1 | 2 | 0 | 10 |
| 9 | 1 | 1 | 0 | | 0 | 1 | 1 | 3 | 9 | 1 | 1 | 0 | | 1 | 0 | 1 | 7 |
| 10 | 1 | 1 | 1 | | 1 | 1 | 1 | 7 | 10 | 1 | 1 | 1 | | 1 | 1 | 1 | 9 |
| 11 | 1 | 1 | 2 | | 2 | 1 | 1 | 11 | 11 | 1 | 1 | 2 | | 1 | 2 | 1 | 11 |
| | | | | | | | | | 12 | 2 | 0 | 0 | | 2 | 0 | 0 | 12 |
| | | | | | | | | | 13 | 2 | 0 | 1 | | 2 | 1 | 0 | 14 |

TABLE 1-continued

Permutations for stages 0 and 1 of an interconnect constructed with 2 × 3 switching elements

| Stage 0 | | | | | | | | | Stage 1 | | | | | | | |
|---|---|---|---|---|---|---|---|---|---|---|---|---|---|---|---|---|
| $X_0$ | $(\alpha_1$ | $\alpha_0$ | $\beta_0)$ | $\rightarrow$ | $(\beta_0$ | $\alpha_0$ | $\alpha_1)$ | $Y_0$ | $X_1$ | $(\beta_1$ | $\alpha_0$ | $\beta_0)$ | $\rightarrow$ | $(\beta_1$ | $\beta_0$ | $\alpha_0)$ | $Y_1$ |
| | | | | | | | | | 14 | 2 | 0 | 2 | | 2 | 2 | 0 | 16 |
| | | | | | | | | | 15 | 2 | 1 | 0 | | 2 | 0 | 1 | 13 |
| | | | | | | | | | 16 | 2 | 1 | 1 | | 2 | 1 | 1 | 15 |
| | | | | | | | | | 17 | 2 | 1 | 2 | | 2 | 2 | 1 | 17 |

What is claimed is:

1. A massively parallel processing (MPP) system, comprising:
   (a) a plurality of processing nodes; and
   (b) an interconnection network for interconnecting the processing nodes, wherein the interconnection network is comprised of a plurality of identical fabrics, each of the fabrics is comprised of a plurality of switching elements, and the interconnection network is partitioned so that each switching element in a first stage of each of the fabrics is co-located in at least one concentrator with corresponding switching elements from the other fabrics.

2. The system of claim 1, wherein each of the switching elements comprises an a port by b port switching element, which is identified as an a×b switching element, wherein the a ports are input ports and the b ports are output ports, such that (a+b)>2.

3. The system of claim 2, wherein a>1 and b>0.

4. The system of claim 2, wherein a>0 and b>1.

5. The system of claim 2, wherein the interconnection network is comprised of K fabrics, such that K>1.

6. The system of claim 5, wherein each processing node connected to the interconnection network has at least K bidirectional links connecting the processing node to the interconnection network with at least one link per fabric.

7. The system of claim 5, wherein there are $a^{n-}$ concentrators for co-locating the corresponding switching elements in the first stage of each of the fabrics, and n is the number of stages in each fabric.

8. The system of claim 7, wherein n=$\lceil \log_a(N) \rceil$, N is the total number of input or output ports associated with the first stage of each fabric connected to the processing nodes, and $\lceil\ \rceil$ is a ceiling function.

9. The system of claim 8, wherein each concentrator has a incoming N-trunks each having K links and K outgoing C-trunks each having b links.

10. The system of claim 9, wherein each C-trunk contains $C_{C-trunk}=\lceil b/W \rceil$ cables and W is the number of bidirectional links per cable.

11. The system of claim 10, wherein all of the links in the C-trunk are connected to the same fabric.

12. The system of claim 10, wherein the concentrator accepts N-trunks from each of the processing nodes and regroups them into multiple C-trunks that each connect to different fabrics.

13. The system of claim 5, wherein the concentrators are K self-contained fabrics for the processing nodes.

14. The system of claim 1, wherein the remaining stages of each fabric is implemented and physically packaged independently of the other fabrics.

15. The system of claim 1, wherein the interconnection network is comprised of a plurality of concentrators.

16. The system of claim 1, wherein the concentrators are co-located with the processing nodes.

17. An interconnection network comprising a plurality of identical fabrics for interconnecting a plurality of processors for communication therebetween, each of the fabrics comprised of at least one stage, each stage comprised of a plurality of switching elements, one or more of the switching elements from a first stage of each of the fabrics being combined together in at least one concentrator, the concentrator allowing all links from each processor to the fabrics to be combined into a single cable coupled to the concentrator.

18. The interconnection network of claim 17, wherein each of the switching elements comprises an a port by b port switching element, which is identified as an a×b switching element, wherein the a ports are input ports and the b ports are output ports, such that (a+b)>2.

19. The interconnection network of claim 18, wherein a>1 and b>0.

20. The interconnection network of claim 18, wherein a>0 and b>1.

21. The interconnection network of claim 18, wherein the interconnection network is comprised of K fabrics, such that K>1.

22. The interconnection network of claim 21, wherein each processor connected to the interconnection network has at least K bidirectional links connecting the processor to the interconnection network with at least one link per fabric.

23. The interconnection network of claim 21, wherein there are $a^{n-1}$ concentrators for co-locating the corresponding switching elements in the first stage of each of the fabrics, and n is the number of stages in each fabric.

24. The interconnection network of claim 23, wherein n=$\lceil \log_a(N) \rceil$, N is the total number of input or output ports associated with the first stage of each fabric connected to the processors, and $\lceil\ \rceil$ is a ceiling function.

25. The interconnection network of claim 24, wherein each concentrator has a incoming N-trunks each having K links and K outgoing C-trunks each having b links.

26. The interconnection network of claim 25, wherein each C-trunk contains $C_{C-trunk}=\lceil b/W \rceil$ cables and W is the number of bidirectional links per cable.

27. The interconnection network of claim 25, wherein all of the links in the C-trunk are connected to the same fabric.

28. The interconnection network of claim 25, wherein the concentrator accepts N-trunks from each processor and regroups them into multiple C-trunks that each connect to different fabrics.

29. The system of claim 21, wherein the concentrators are K self-contained fabrics for the processors.

30. The interconnection network of claim 17, wherein the remaining stages of each fabric are implemented and physically packaged independently of the other fabrics.

31. The interconnection network of claim 17, wherein the interconnection network is comprised of a plurality of concentrators.

32. The interconnection network of claim 17, wherein the concentrators are co-located with the processors.

33. The interconnection network of claim 17, wherein the concentrator allows all the links from a single switching element in the first stage to be combined into a single cable to be connected to subsequent stages of the fabric.

34. The interconnection network of claim 33, wherein the subsequent stages of each fabric are implemented independently of other fabrics in a centralized location.

35. The interconnection network of claim 17, wherein the concentrators are physically distributed among the processors.

36. A concentrator for an interconnection network, the interconnection network comprising a plurality of identical fabrics for interconnecting a plurality of processors for communication therebetween, each of the fabrics comprised of at least one stage, each stage comprised of a plurality of switching elements, one or more of the switching elements from a first stage of each of the fabrics being combined together in the concentrator, wherein the concentrator allows all links from each processor to the fabrics to be combined into a single cable coupled to the concentrator.

37. The concentrator of claim 36, wherein each of the switching elements comprises an a port by b port switching element, which is identified as an a×b switching element, wherein the a ports are input ports and the b ports are output ports, such that (a+b)>2.

38. The concentrator of claim 37, wherein a>1 and b>0.

39. The concentrator of claim 37, wherein a>0 and b>1.

40. The concentrator of claim 37, wherein the interconnection network is comprised of K fabrics, such that K>1.

41. The concentrator of claim 40, wherein each processor connected to the interconnection network has at least K bidirectional links connecting the processor to the interconnection network with at least one link per fabric.

42. The concentrator of claim 40, wherein there are $a^{n-1}$ concentrators for co-locating the corresponding switching elements in the first stage of each of the fabrics, and n is the number of stages in each fabric.

43. The concentrator of claim 42, wherein $n=\lceil \log_a(N) \rceil$, N is the total number of input or output ports associated with the first stage of each fabric connected to the processors, and $\lceil \ \rceil$ is a ceiling function.

44. The concentrator of claim 43, wherein the concentrator has a incoming N-trunks each having K links and K outgoing C-trunks each having b links.

45. The concentrator of claim 44, wherein each C-trunk contains $C_{C\text{-}trunk}=\lceil b/W \rceil$ cables and W is the number of bidirectional links per cable.

46. The concentrator of claim 44, wherein all of the links in the C-trunk are connected to the same fabric.

47. The concentrator of claim 44, wherein the concentrator accepts N-trunks from each of the processors and regroups them into multiple C-trunks that each connect to different fabrics.

48. The concentrator of claim 40, wherein the concentrator comprises K self-contained fabrics for the processors.

49. The concentrator of claim 36, wherein the remaining stages of each fabric are implemented and physically packaged independently of the other fabrics.

50. The concentrator of claim 36, wherein the concentrator is co-located with one or more of the processors.

51. The concentrator of claim 50, wherein the concentrator allows all the links from a single switching element in the first stage to be combined into a single cable to be connected to the subsequent stages of the fabric.

52. The concentrator of claim 51, wherein the concentrator is physically distributed among the processors.

* * * * *

UNITED STATES PATENT AND TRADEMARK OFFICE
CERTIFICATE OF CORRECTION

PATENT NO. : 6,473,827 B2
DATED : October 29, 2002
INVENTOR(S) : McMillen, R. J. and Nguyen, C. K.

It is certified that error appears in the above-identified patent and that said Letters Patent is hereby corrected as shown below:

Column 15,
Line 41, delete "$a^{n-}$" and insert -- $a^{n-1}$ --

Signed and Sealed this

Twenty-third Day of November, 2004

JON W. DUDAS
*Director of the United States Patent and Trademark Office*